United States Patent [19]

Graham

[11] 4,001,365

[45] Jan. 4, 1977

[54] LOAD-BEARING WALL PANEL WHOSE ELEMENTS ARE MORTAR-BINDED, AND APPARATUS AND METHOD FOR FABRICATING SAME

[76] Inventor: Wilson E. Graham, R.D. No. 1, Rensselaer, N.Y. 12144

[22] Filed: Jan. 20, 1975

[21] Appl. No.: 542,585

[52] U.S. Cl. .................................. 264/69; 52/744; 264/233; 264/261; 264/338

[51] Int. Cl.$^2$ ...................... B28B 1/08; B32B 31/06

[58] Field of Search ................ 264/261, 69, 70, 71, 264/233, 338; 52/744

[56] References Cited

UNITED STATES PATENTS

| | | | |
|---|---|---|---|
| 3,608,051 | 9/1971 | Scott | 264/261 |
| 3,629,384 | 12/1971 | Elgenstierna | 264/261 X |

*Primary Examiner*—Robert F. White
*Assistant Examiner*—Thomas P. Pavelko

[57] ABSTRACT

A load-bearing wall panel is fabricated by disposing an assembly of spaced-apart and aligned, hollow-cored bricks onto a molding base containing melted paraffin. Contact of the cooler bricks with the melted paraffin forms a thin skin of solidified paraffin on the brick bottom portions and forces melted paraffin within the joints forming therein a double-convex configuration of solidified paraffin, thereby water-proof sealing the brick bottom portions and joints preparatory to mortar introduction. After curing of the mortar introduced in the joints and cores, the resulting wall panel has load-bearing capacity and unique, double-concave mortar joints that are smooth, water-proof and weather-proof.

8 Claims, 9 Drawing Figures

LOAD-BEARING WALL PANEL WHOSE ELEMENTS ARE MORTAR-BINDED, AND APPARATUS AND METHOD FOR FABRICATING SAME

This invention relates to a load-bearing wall panel whose elements are mortar-binded, and the apparatus and method for fabricating same.

It appears that in the present state of the art pertaining to prefabricated brick masonry construction, the square-foot cost of producing prefabricated brick wall panels is the same or slightly higher than the production cost of conventional hand-laid masonry construction. Of course, such cost comparisons vary in some degree, but nevertheless not substantially, throughout the United States, for reasons of the differences, from area to area, of the costs of materials and labor. There are transcending needs, whether the brick wall panels are prefabricated or are hand-laid on site, for brick wall panels whose exposed, facing mortar joints are smooth, water-tight and weather-proof, whose joints are uniformly spaced, whose bricks are aligned horizontally and vertically, and for the resulting, facing brick wall panel itself to be flat, square and true. In other words, there is a transcending need for quality in the product whether the brick wall panel is prefabricated or hand-laid on site.

Accordingly, the objects of this invention are to contribute to the solutions of the discussed problems of the art by permitting load-bearing, brick wall panels to be prefabricated at a competitive cost of less than half that of present prefabrication methods or conventional, on-site, hand-laid construction, by achieving, through this invention's apparatus and method of prefabrication, brick wall panels whose exposed, facing mortar joints are smooth, water-tight and weather-proof by means of unique, double-concave, exposed joints, whose joints are uniformly spaced, whose bricks are aligned horizontally and vertically, whose brick faces are clean, whose resulting facing brick wall panels are flat, square and true, whose resulting brick wall panels have strength and structural rigidity, and possess load-bearing capacity for utilization in residential, commercial or industrial construction.

These objects and other objects of the invention should be discerned and appreciated by reference to the detailed specification taken in conjunction with the drawings, wherein like reference numerals refer to similar parts throughout the several views, in which.

Figure 1:
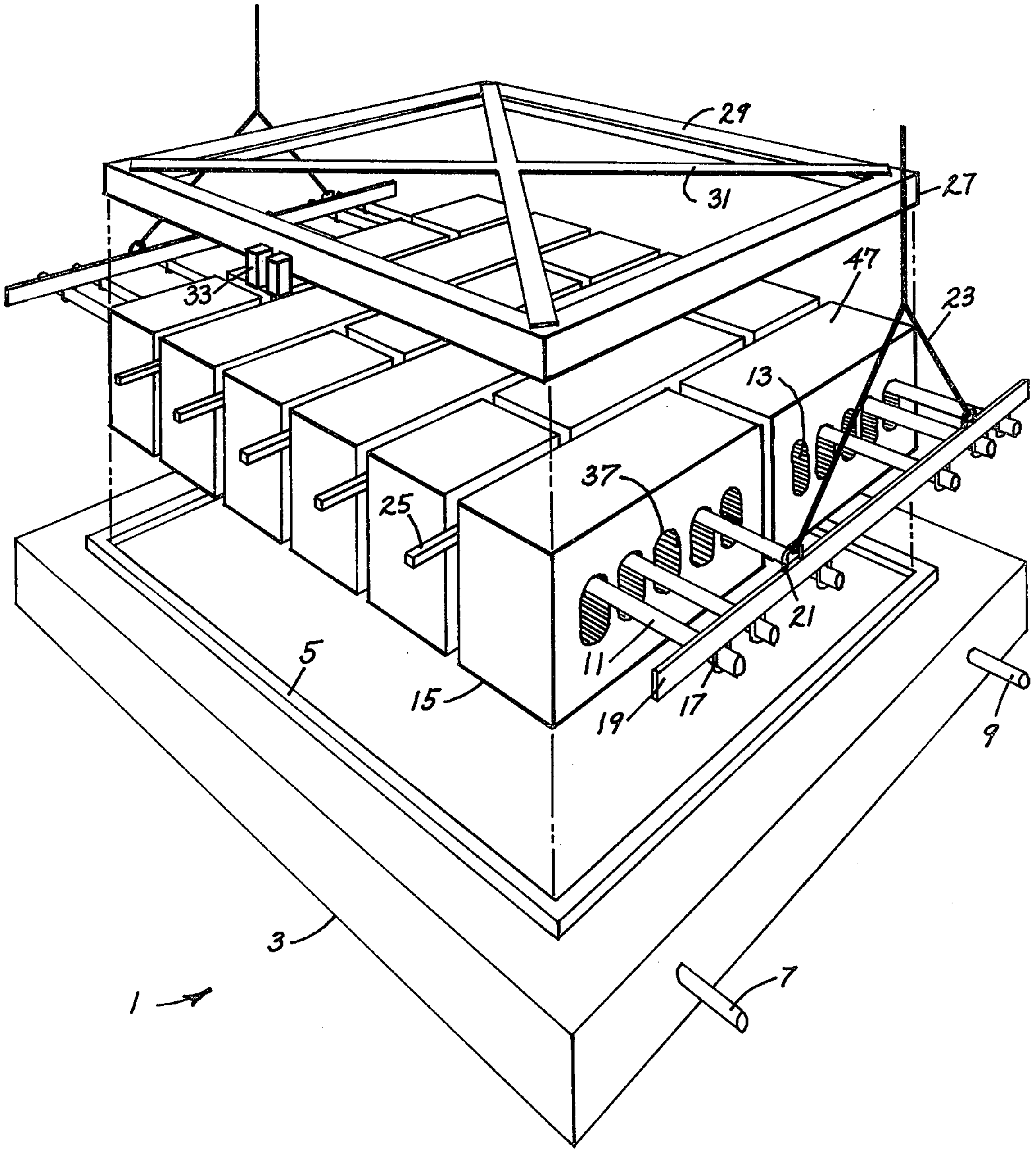
FIG. 1 is an expanded, perspective view of the apparatus of the invention.
Figure 2:
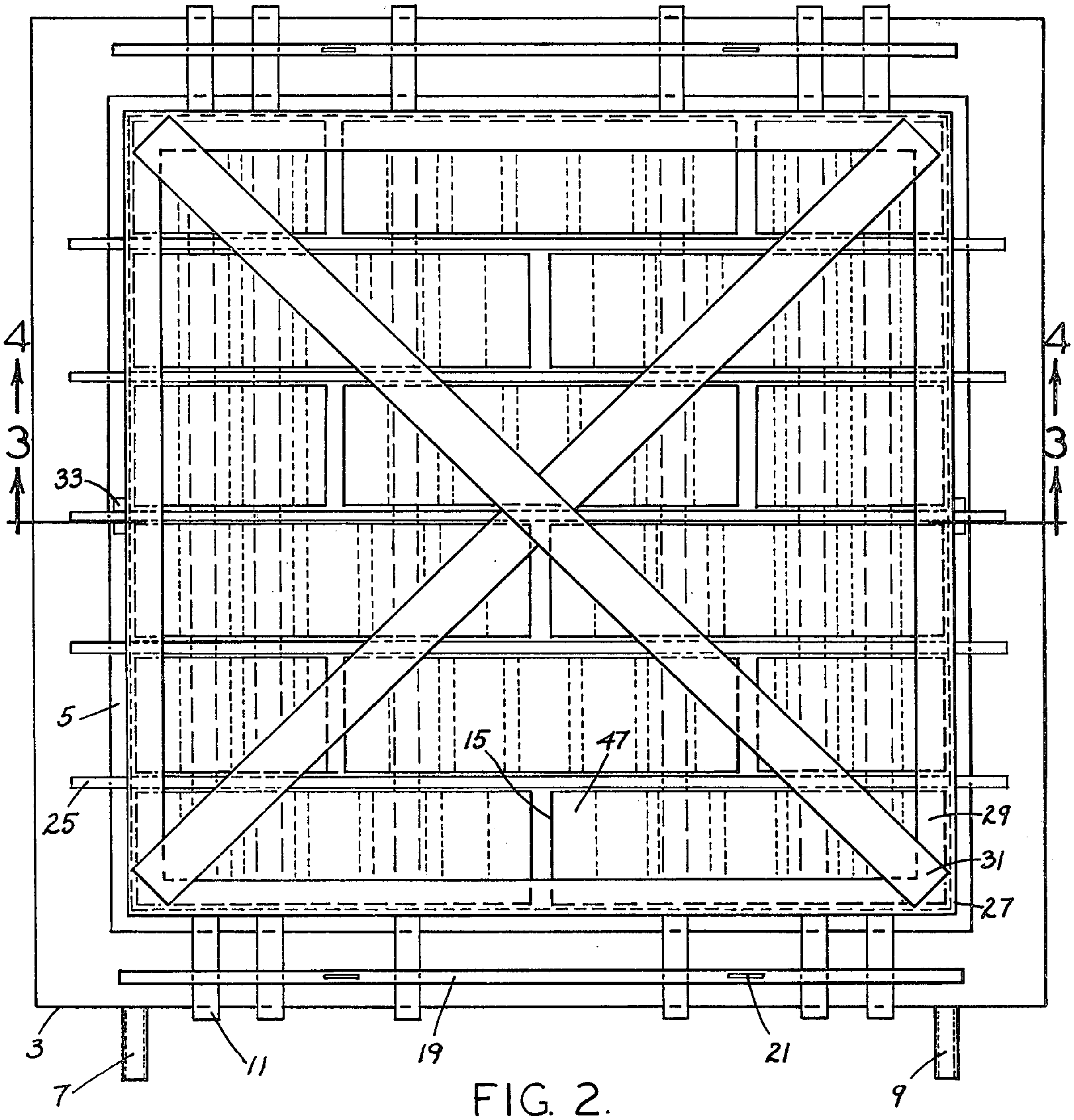
FIG. 2 is a top plan view of FIG. 1.
Figure 3:
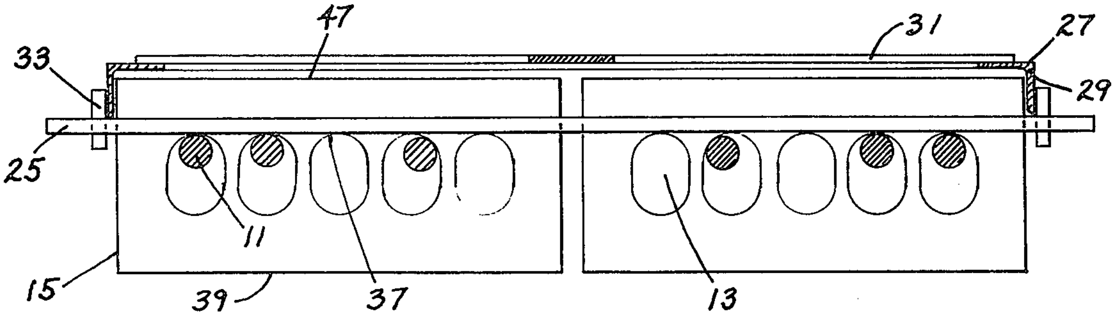
FIG. 3 is a sectional view taken in the direction of the arrows 3 — 3 in FIG. 2.
Figure 4:
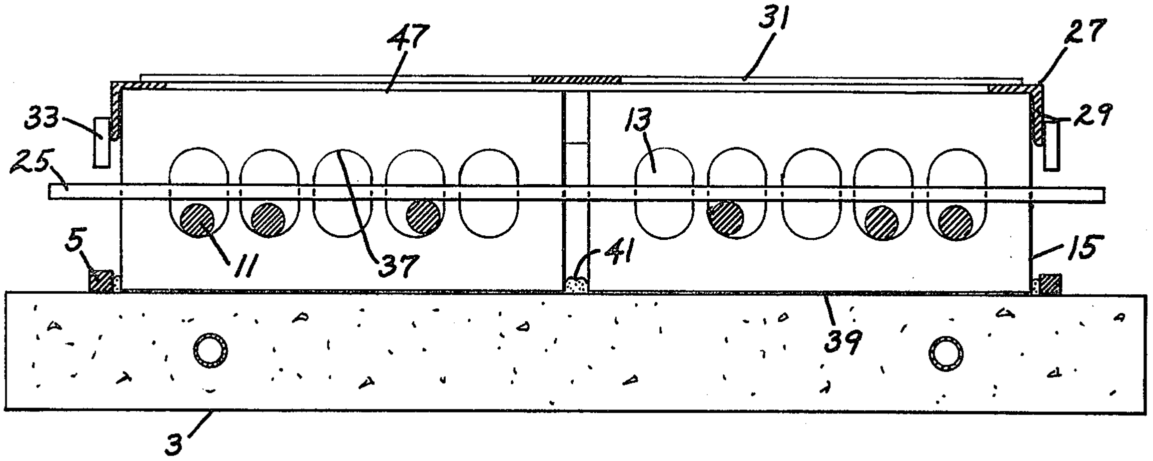
FIG. 4 represents the sectional view shown in FIG. 3 after the bricks are emplaced on the molding base.
Figure 5:
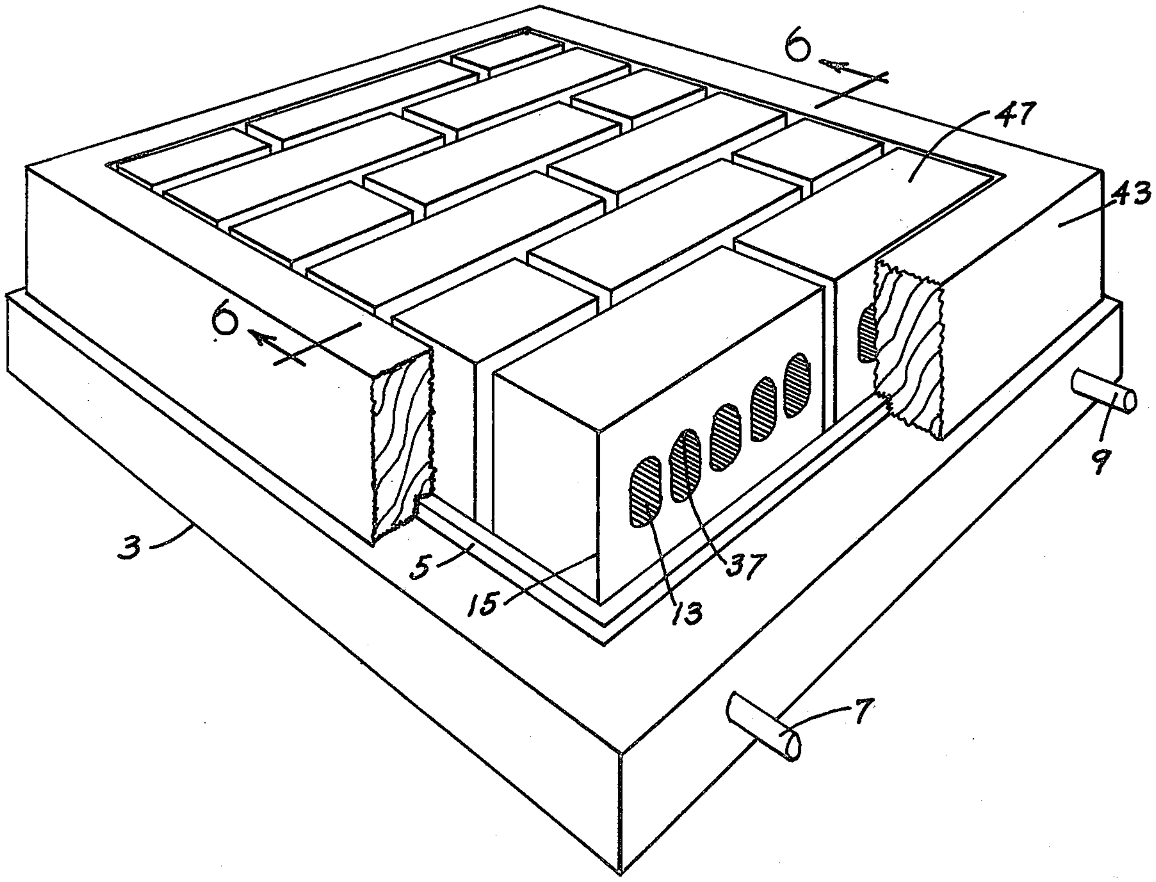
FIG. 5 shows the bricks emplaced on the molding base and with the form thereon preparatory for pouring the mortar.
Figure 6:
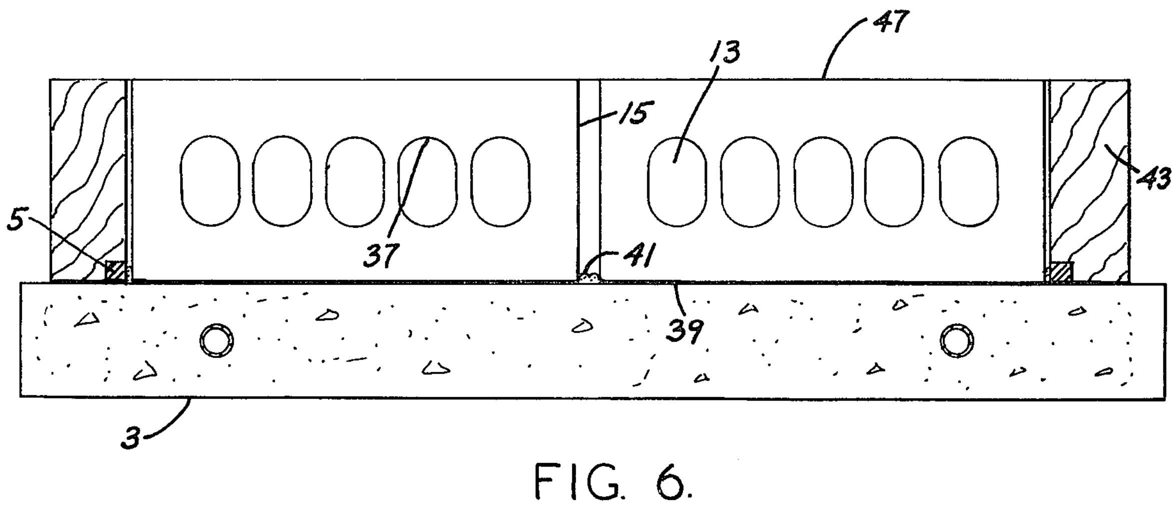
FIG. 6 is a sectional view taken in the direction of the arrows 6 — 6 in FIG. 5.
Figure 7:
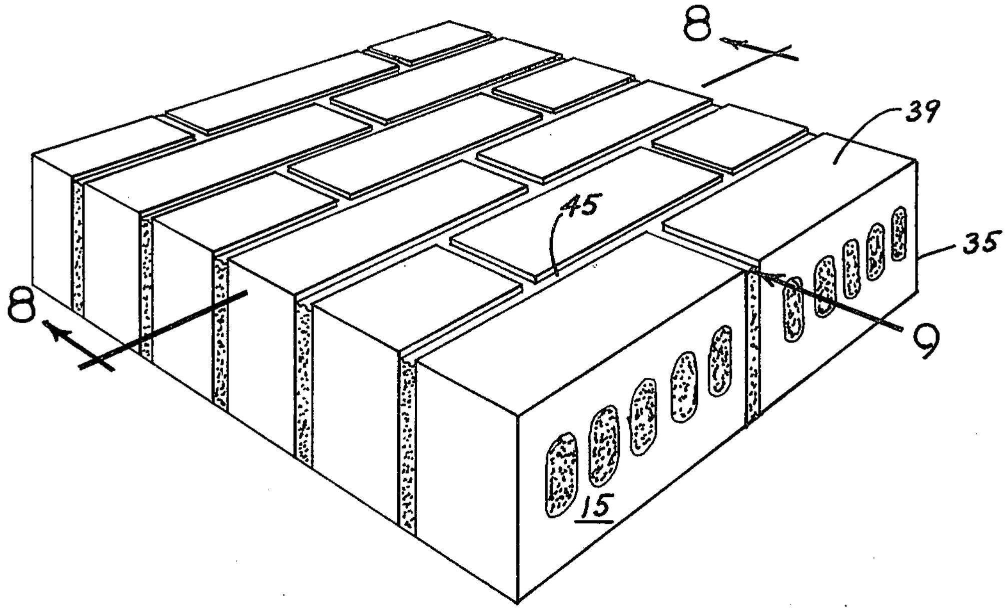
FIG. 7 is a perspective view of the fabricated brick wall panel of this invention.
Figure 8:
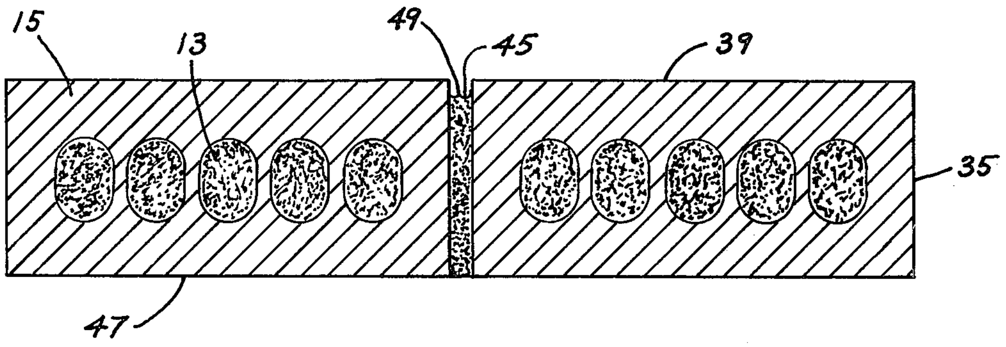
FIG. 8 is a sectional view taken in the direction of the arrows 8 — 8 in FIG. 7.
Figure 9:
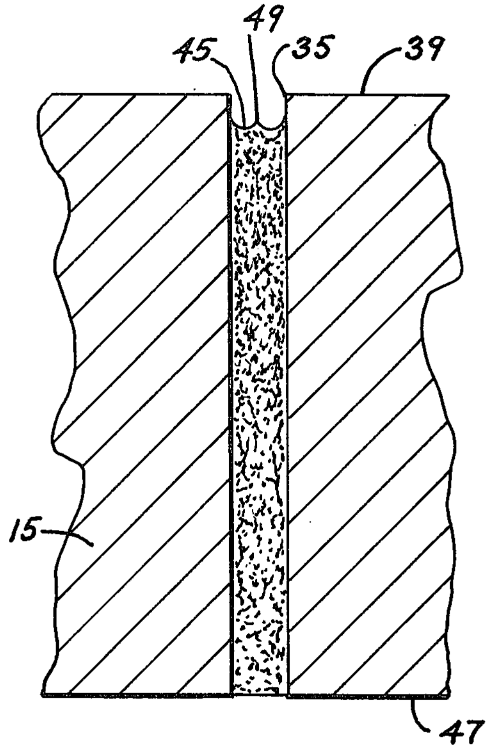
FIG. 9 is an exploded view taken in the direction of the arrow 9 in FIG. 7.

To facilitate the understanding of the invention, a nomenclature list is hereby provided:

1 — generally refers to the invention
3 — molding base
5 — upstanding side
7 — inlet
9 — outlet
11 — supporting rod
13 — core
15 — hollow brick
17 — U-shaped loop
19 — yoke
21 — U-shaped loop
23 — cable
25 — spacing bar
27 — confining frame
29 — angle iron
31 — cross-bracing
33 — coursing guide
35 — brick wall panel
37 — upper semi-circular portion of core 13
39 — bottom portion of brick 15
41 — double-convex configuration of paraffin
43 — form
45 — double-concave mortar joint
47 — top portion of brick 15
49 — protruding center portion of joint 45

In FIG. 1 of the drawings, reference numeral 1 generally refers to the invention.

Molding base 3 which is flat has upstanding sides 5 defining a shallow liquid holding receptacle. Base 3 is made of concrete or other suitable material. Inlet 7 of tubing imbedded within base 3 communicates with a suitable hot water supply, not shown, and outlet 9 communicates with the cold-water return to such hot water supply for the circulation thereby of hot water to and through the imbedded tubing to heat base 3. Instead of circulating hot water through imbedded tubing to heat base 3, electric heating coils can be imbedded within base 3 to heat base 3.

Supporting rods 11, disposed through the cores 13 of hollow bricks 15, are removably carried by U-shaped loops 17 fixed to and depending from the yokes 19. Inverted, U-shaped loops 21 are fixed to and upstanding from the yokes 19. Cable 23, connected to loops 21, are suitably, operatively connected to a lifting device such as a crane, not shown, for purposes of raising or lowering yokes 19.

Square-shaped spacing bars 25 whose dimension in cross section is determinative of the desired spacing and hence thickness of the mortar joints are disposed between the courses of the bricks 15, as shown, and rest upon the supporting rods 11.

Confining frame 27 has angle irons 29 to which are fixed diagonally disposed cross-bracing 31, as shown. Depending coursing guides 33 are fixed to opposed angle irons 29, as shown.

This specification describes the fabrication of a brick wall panel 35 of two-bricks length and six-courses height. This description is given as an example only of the invention and to simplify such description thereby. It should be clearly understood and appreciated that it is within the concept of this invention and the coverage sought herein to prefabricate brick wall panels of different heights and lengths by utilizing therefor molding bases 3 of corresponding size, along with corresponding rods 11, yokes 19, spacing bars 25 and confining frames 27 of appropriate size and dimension.

Depending upon the desired depth of the resulting mortar joint, a discrete quantity of thermoplastic material such as paraffin or similar suitable material is disposed within molding base 3 defined by its sides 5 and melted by circulating hot water through tubing inlet 7 with the paraffin being maintained in such melted state by continued circulation of such hot water.

Supporting rods 11 are appropriately disposed through the cores 13 of the assembled full-size and half-size bricks 15 and through depending loops 17. Then spacing bars 25 are appropriately disposed between bricks 15 to rest cross-wise on supporting rods 11. Confining frame 27 is appropriately disposed upon the perimeter of the assembled bricks to constrain the bricks to the desired size of the brick wall panel 35 to be fabricated.

The lifting device is appropriately operated to raise the yokes 19 and thereby the entire assembly of bricks 15 and then such lifting device is appropriately operated to dispose and position such assembly of bricks 15 preparatory to lowering same upon molding base 3 and within its confining sides 5.

It should be noted that when the assembly of bricks 15 is raised by the supporting rods 11 carried by yokes 19 — together with the cooperation of spacing bars 25, confining frame 27 and coursing guides 33 — the entire assembly of the bricks 15 is aligned both horizontally and vertically for subsequent use and upright positioning of the prefabricated wall panel 35. The confining frame 27 constrains the perimeter bricks to both the desired size of the brick wall panel 35 as well as to horizontal alignment. When confining frame 27 is positioned upon the perimeter of the bricks 15, the coursing guides 33 receive therein the immediately adjacent spacing bar 25 and thereby further constrain the bricks 15 to uniform course spacing as well as to such alignment. And the spacing bars function to constrain the bricks 15 to course spacing and to such alignment. Moreover, the brick cores 13 have upper and lower semi-circular portions. When the brick assembly is raised by the round supporting rods 11 disposed through the brick cores 13, the upper, semi-circular portions 37 of the brick cores 13 center themselves on their respective round supporting rods 11 and thereby constrain the bricks 15 to such desired alignment. It should be noted that the number of coursing guides which would be utilized depends upon the number of courses in a particular brick wall panel. Coursing guides 33 would be employed for every three courses of bricks 15.

The bottom portions 39 of the bricks 15, lowered upon molding base 3, become the exposed faces of the prefabricated brick wall panel 35. The temperature of the bricks 15 must be sufficiently cooler than the temperature of the melted paraffin within the molding base 3 in order that when the bricks 15 are lowered upon the molding base 3 the cooler bricks 15 will cause a thin skin of paraffin to solidify on the bottom portions 39 of bricks 15 but with the melted paraffin being forced into the joints between the bricks 15 and with the paraffin in the mid points between and within the joints remaining in a melted state. Since the bottom portions 39 of the bricks 15 and immediately thereafter the surfaces of the bricks 15 between their mortar joints, upon contact with the melted paraffin, cool, solidify and cause thereby a thin skin of such paraffin to form on the bottom portions 39 of the bricks 15 and immediately thereafter on the contacting surfaces of the bricks 15 between their mortar joints, this thin skin of solidified paraffin can not shrink. However, the paraffin in the mid points between and within the joints remains in a melted state which, upon subsequently cooling and solidifying, shrinks the most at such mid portions between and within the joints. This paraffin in its solidified state between and within the joints has a double-convex configuration 41. It should be noted that immediately before the assembly of bricks 15 is lowered upon the molding base 3 all circulation of hot water through the imbedded tubing ceases.

As will be explained in detail, such double-convex configuration of solidified paraffin between and within the joints provides thereby a joint molding surface which results in the molding of unique, double-concave, exposed, mortar joints 45 that are smooth, water-tight and weather-proof.

When the bottom portions or faces 39 of the bricks 15 contact the melted paraffin and cause such thin skin of solidified paraffin to form, any loose particles, dirt or dust on the brick faces 39 adhere to this solidified skin of paraffin thereby cleaning such brick faces 39.

The assembly of bricks 15 lowered upon molding base 3 is aligned both horizontally and vertically. Since the molding base 3 is flat, the bottom portions or faces 39 of the bricks 15 are flat, square and true and, hence, the faces 39 of the prefabricated brick wall panel 35 similarly will be flat, square and true.

For reason of the latent heat within the molding base 3, the melted paraffin in contact with molding base 3 is the last to cool and solidify and, hence, its adhesion to molding base 3 remains significantly greater than the initial adhesion of the paraffin to the bottom portions or faces 39 of bricks 15, not only thereby facilitating removal of the wall panel 35 from its molding base 3 but also leaving little paraffin residue on the bottom portions or faces 39 of bricks 15.

The initial thin skin of solidified paraffin formed on the bottom portions or faces 39 of the bricks 15, as well as the solidified paraffin formed between and within the joints, thereby constitutes a protective water-tight seal to prevent any mortar or residue forming on or discoloring the bottom portions or faces 39 of bricks 15.

In addition thereto, such solidified paraffin retains and holds the bricks 15 in their assembled positions on the molding base 3.

After the paraffin has solidified, the confining frame 27, spacing bars 25, supporting rods 11 and yokes 19 are appropriately removed. Then form 43, as shown, is appropriately disposed around the perimeter of bricks 15 preparatory to the pouring of mortar.

High-bond mortar, compatible with the bricks 15 and suitable to provide the brick wall panel 35 with sufficient tensile bond strength to permit early handling of the finished wall panel 35 is suitably introduced, such as by gravity pour over the top portions 47 of bricks 15, to fill thereby the interstices of the cores 13 and joints, followed by appropriate vibration to remove any entrapped air, to effectively fabricate a dense, monolithic wall panel 35 with an absolute minimum of voids.

Usually, within a period of two days, the mortar has attained sufficient bond strength such that the brick wall panel 35 can be removed from its molding base 3 and utilized for its intended use as a load-bearing brick wall panel.

After removal of the perimeter form 43, the wall panel is suitably raised to remove same from molding base 3. Should any paraffin residue have adhered to the faces 39 of the bricks, same can be easily removed by appropriate application of hot water thereto. It should further be noted and appreciated that the paraffin used in the fabrication of the brick wall panel 35 remains on the molding base 3 and is completely reusable for the next and succeeding wall panels to be fabricated, and, in addition thereto paraffin is inexpensive.

There are nine conventional mortar joints: weathered, struck, convex, concave, flush-cut, V-tooled, stripped, rodded and raked-out.

The double-convex configuration 41 of the solidified paraffin in the joints results in complemental, double-concave mortar joints 45 being formed. By gravity action, the mortar poured over the top portions 47 of bricks 15, along with such subsequent vibration to remove entrapped air, results in a unique, double-concave mortar joint 45 whose facing surface is not only denser and smoother than conventional mortar joints, but also results in a mortar joint 45 that is water-tight and weather-proof. Mortar joint 45 is densest at its facing surface because of the gravity pour of the mortar. The double-concave joint 45 does not allow water to accumulate at the points where the mortar meets the brick and, hence, ice can not form to damage the joint and the bricks. In the unlikelihood of ice forming in the joint, the protruding center portion 49 causes maximum stresses to occur in the ice at this protruding center portion 49 thereby fracturing such ice at this center portion and relieving the joint of the stresses the ice would otherwise exert upon and against the joint of the bricks.

Not only cost-wise but also quality-wise, it is deemed that this invention makes substantial contributions to the art. The quality attributes of this invention over the prior art have been set forth in detail hereinbefore. Depending upon the skill and expertise of labor employed to fabricate the load-bearing brick wall panels 35 of this invention, the time to fabricate such brick wall panel 35 is only 40%, or substantially less, of the time required to conventionally hand-lay a comparable brick wall on a size basis of comparison.

By utilizing this invention, the cost to fabricate and replace the conventional one-story, 24′ × 36′ brick house and the 120′ of 2 × 4 perimeter wall framing would be less than 31% of the cost of conventional materials and labor, for a savings of over 69%. Utilizing this invention, all four walls of this 24′ × 36′ house can be put up in one day. Another factor to be considered is that as labor costs rise in a particular area, appreciable savings over conventional construction costs would be further realized.

Having thusly described my invention, I claim:

1. A method of fabricating a wall panel whose elements have mortar-binded joints, the facings of which are double-concave, smooth, water-proof and weather-proof, comprising: disposing said elements on trapped, melted thermoplastic material with the temperature of said elements being sufficiently cooler than the temperature of said melted thermoplastic material such that upon contact of said elements with said melted thermoplastic material a thin skin of solidified thermoplastic material forms on the bottom portions of said elements, forcing said melted thermoplastic material between and within said joints of said elements, immediately thereafter allowing said elements contacting said melted thermoplastic material at joint surfaces between said elements to cool, solidify and form thereby a thin skin of solidified thermoplastic material on said contacting joint surfaces between said elements and with said melted thermoplastic material in the mid points between and within said element joints remaining in a melted state, such that said melted thermoplastic material at said mid points between and within said element joints, upon subsequently cooling and solidifying, shrinks the most at said mid points between and within said element joints and forms thereby a double-convex configuration of said thermoplastic material within said joints, thereby water-proof sealing said bottom portions of said elements and their said joints preparatory to the introduction of mortar; allowing the remaining melted thermoplastic material to solidify; introducing mortar within said element joints; allowing said mortar to cure to complete fabrication of said wall panel and for removal of same from said thermoplastic material; and removing said wall panel from said thermoplastic material.

2. The method in accordance with claim 1, including the step of trapping said thermoplastic material on a molding base.

3. The method in accordance with claim 1, including the step of applying carrying means to carry and align said elements.

4. The method in accordance with claim 1, including the step of applying spacing means to maintain said element joints in spaced relationship and to align said elements.

5. The method in accordance with claim 1, including the step of applying confining means to constrain said elements to a desired wall panel size and to align said elements.

6. The method in accordance with claim 1, including the step of applying form means around the perimeter of said elements.

7. The method in accordance with claim 1, including the step of vibrating said elements to remove mortar-entrapped air.

8. The method in accordance with claim 1, including the step of trapping said thermoplastic material on a molding base, including the step of applying carrying means to carry and align said elements, including the step of applying spacing means to maintain said element joints in spaced relationship and to align said elements, including the step of applying confining means to constrain said elements to a desired wall panel size and to align said elements, including the step of applying form means around the perimeter of said elements and including the step of vibrating said elements to remove mortar-entrapped air.

* * * * *